United States Patent [19]

Shropshire

[11] Patent Number: 4,542,914
[45] Date of Patent: Sep. 24, 1985

[54] LOCKABLE HITCH FOR TRAILERN

[76] Inventor: Lucius Shropshire, 3300 Cindy La., Knoxville, Tenn. 37912

[21] Appl. No.: 627,856

[22] Filed: Jul. 5, 1984

[51] Int. Cl.[4] .............................................. B60D 1/06
[52] U.S. Cl. ..................................... 280/507; 70/258
[58] Field of Search .............. 280/507, 511, 432, 512, 280/513; 211/4; 403/130; 70/258

[56] References Cited

U.S. PATENT DOCUMENTS

| | | | |
|---|---|---|---|
| 1,078,801 | 11/1913 | Munsing | 280/432 |
| 3,226,133 | 12/1965 | Geresy | 70/258 X |
| 3,790,192 | 2/1974 | Green | 280/507 |
| 3,797,283 | 3/1974 | Honer | 280/1 X |
| 3,857,575 | 12/1974 | Lee | 280/1 |

FOREIGN PATENT DOCUMENTS 584595  2/1925  France .................. 280/511

*Primary Examiner*—John A. Pekar
*Attorney, Agent, or Firm*—Pitts and Brittian

[57] ABSTRACT

A hitch unit for releasably attaching a towable vehicle to a towing vehicle or to a fixed anchor. This hitch unit has a modified ball unit for the attachment to a towing vehicle or to a fixed support. A singular bolt member is utilized to fasten the ball member in place, with this bolt member threadably passing through the ball member and extending beyond the operating surface of the ball member, terminating in an upper end. This upper end is provided with a transverse hole to accept a conventional locking device. The socket portion of the hitch unit is provided with a central opening in the dome of the socket to permit passage therethrough of the bolt member, with the size of the opening being sufficient to permit the socket member to pivot about the ball member through the degrees normally encountered in utilization of a hitch unit. Thus, the hitch unit of the present invention increases the safety of the hitch as well as preventing the unauthorization utilization of the towable vehicle.

6 Claims, 4 Drawing Figures

LOCKABLE HITCH FOR TRAILERN

TECHNICAL FIELD

The present invention relates generally to hitches of the ball and socket type used for towing vehicles of various configurations. More particularly it relates to a security hitch of this type to increase safety factors of such hitches, as well as prevent the inadvertent and/or unauthorized moving of towed vehicles with such types of hitches.

BACKGROUND ART

There is widespread use of ball and socket type hitches for the towing of various types of vehicles. Most commonly a portion of the trailer hitch is permantly mounted upon the rear of the towing vehicle. This portion of the hitch includes a support plate securely mounted upon the vehicle and a ball member secured to that plate. This ball member typically has a spherical upper portion and a lower skirt portion, with the skirt portion having a flat surface to bear against the upper surface of the support plate. A bolt is utilized to secure the ball member to the support plate. This bolt may be an integral stud extending below the skirt portion to pass through a hole in the support plate and receive a locking nut and washer against the lower surface of the support plate. In alternative constructions, the bolt member may have a head below the support plate and extend upwardly into the skirt and spherical portion of the ball member. Other ball members in use have various other constructions with regard to the securing of the ball member to the support plate of the towing vehicle.

The towed member, frequently in the form of a trailer, has a tongue unit for extending toward the towing vehicle. This tongue terminates in a socket member to closely receive the ball member of the hitch. This socket member has a movable wedge or finger located therein which can be releasably secured against the undersurface of the spherical portion of the ball member such that the socket member is releasably secured to the ball member. For additional safety purposes, safety chains are releasably connected between the towing vehicle and the towed vehicle to prevent complete separation of the two vehicles if the connection between the ball and socket should, for any reason, become separated.

A problem that is frequently encountered is the unauthorized connection of the socket portion of the hitch unit to a towing vehicle not owned by the owner of the towed vehicle. For example, trailers used for camping, the transport of pleasure boats, etc., frequently are stored in garages or yards for extended periods of time. The theft of such trailers is a common occurrence if the trailer is left unattended. In addition, it is common practice for fishermen and the like to leave trailers coupled to their towing vehicle at or near launching ramps. Again, thievery of the trailer unit frequently occurs through the unauthorized connection of the socket member of the trailer to a ball member on another vehicle.

Several devices have been developed to at least minimize the unauthorized use of trailers and the like. One such device is shown in U.S. Pat. No. 3.226,133 issued to S. Geresy on Dec. 28, 1965. In this device, a separate "artificial" ball is provided which can be locked within the socket of a trailer hitch to prevent the insertion of another ball therein. This ball is held in place by several embodiments of appropriate mechanisms. Another type of "artificial" ball developed by the same inventor is shown in U.S. Pat. No. 3,237,969 issued on Mar. 1, 1966. Both of these devices prevent coupling to another ball as stated. However, with little effort, the trailer can be fastened to a towing vehicle by other means such that the trailer and contents may be stolen. In addition, neither of these devices provide for additional safety with regard to the connection of the ball and the socket for normal trailing.

One hitch structure that has been designed for increased safety is that shown in the patent to M. L. McCorkle, U.S. Pat. No. 3,442,534 issued on May 6, 1969. In this device, a safety bolt is inserted through the dome of the socket portion of the hitch to be threadably engaged in a hole in the top of the ball. This bolt carries a cap means of some type which prevents the complete separation of the socket from the ball.

Still another type of trailer hitch designed to achieve increased safety is that shown in U.S. Pat. No. 4,428,596 issued to T. G. Bell, et al., on Jan. 31, 1984. This device has an additional plate member carried by the ball portion of the hitch which can be lockably secured to the socket portion of the hitch away from the ball. There is no provision in this structure to prevent unauthorized use of the trailer.

Accordingly, it is a principal object of the present invention to provide a trailer hitch which can be used in a conventional manner and which provides for the prevention of unauthorized use of either the towing vehicle or the towed vehicle.

It is another object of the present invention to provide a trailer hitch which adds additional safety features to the connection between the towing vehicle and the towed vehicle.

These and other objects of the present invention will become apparant upon consideration of the drawings identified below and the following descriptive material.

DISCLOSURE OF THE INVENTION

In accordance with the present invention, a ball and socket type hitch is provided which achieves increased safety as well as preventing unauthorized use of trailer-like devices. The ball portion of the hitch is attached to a towing vehicle, or to a fixed structure, in such a manner that the attaching means penetrates the entire ball and projects above the ball. The socket member is provided with an aperture whereby the ball attaching means penetrates this aperture. A transverse hole near the extremity of the attaching means permits the insertion of the shank of a locking mechanism such as a padlock. The aperture in the socket member is made sufficiently large to permit normal movement of the socket member about the ball as necessary during the normal transport of a towed vehicle by a towing vehicle.

BEST MODE FOR CARRYING OUT THE INVENTION

Figure 1:
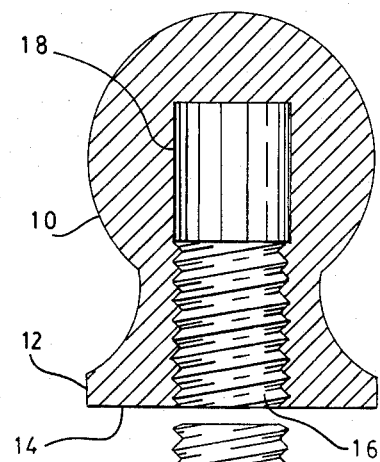
FIG. 1 is a drawing, partially in section, showing a typical prior art ball unit for use with trailer hitches.

To better understand the preferred embodiment of the present invention, reference is made to FIG. 1 which shows a typical prior art trailer hitch component. In this construction, there is a typical generally spherical element 10 provided with a skirt element 12. This skirt element 12 has a planar lower surface 14 to bear against a support plate (not shown) on a towing vehicle. Axially located through the skirt portion and a portion of the ball portion is a passageway provided along a portion of its length with threads 16 within the central portion of the ball 10. This passageway is enlarged to form a cylindrical cavity 18 having a diameter slightly greater than the maximum diameter of the threads 16. There is provided a bolt member having a head 20 and a threaded shank 22. The threaded shank is threadably receivable within the threads 16, with the undersurface 24 of the head 20 bearing against the above-mentioned support plate on the towing vehicle. Although not shown, it is conventional to use a lock washer or other securing element between the head surface 24 and the support plate.

Figure 2:
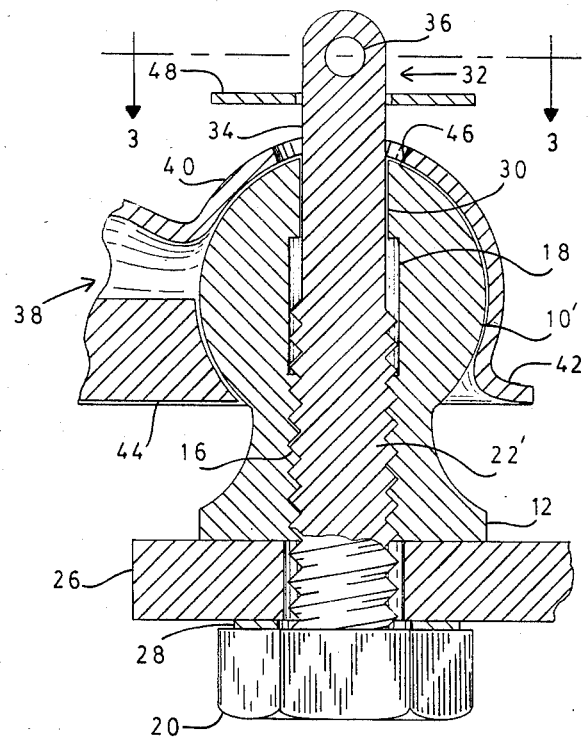
FIG. 2 is a cross-sectional drawing of the trailer hitch unit of the present invention.

Referring now to FIG. 2, shown therein is an embodiment of the present invention which incorporates in part the ball unit shown in FIG. 1. Any component which is identical to that of FIG. 1 bears the same number and any that have been slightly modified bear the same numbers with a prime. This figure shows the support plate 26 which is mounted appropriately from or on a towing vehicle, and also shown is the aforementioned lock washer 28.

In this embodiment, the ball 10' has been modified by extending the passageway entirely through the ball by drilling a hole 30 which extends from the cylindrical chamber 18 through the top of the ball 10'. This construction then provides for the use of a bolt member 32. This bolt member 32 has an identical head 20 and a threaded shank portion 22' similar to those shown in FIG. 1. Furthermore, the bolt 32 is provided with an extended unthreaded shank 34 which, when used in conjunction with the ball 10', extends substantially above the upper surface of the ball 10'. Adjacent the extreme end of the bolt 32 is provided a transverse hole 36 for purposes described hereinafter.

Also shown in this figure is a typical socket member 38 as used with trailer hitches and the like. It has a conventional domed-shaped portion 40 which is provided to embrace the ball 10', with the domed-member having a reenforcing rib 42. Also, the socket member contains a conventional wedge member 44 which is operated by conventional means to bear against the underside of the ball 10' and thereby secure the ball 10' within the domed-shaped portion 40 of the hitch 38. Because the bolt 32 extends above the ball 10', the domed portion 40 of the socket 38 is provided with an opening 46 at its uppermost point. This hole or aperture 46 permits the unthreaded shank 34 of the bolt 32 to extend upwardly from and through the socket member 38. The size of the opening 46 is such that pivotal action of the socket member 38 about the ball 10' is permitted in all normal operating orientations without the interference of this opening with the shank 34. If desired, a washer 48 may encircle the extension shank 34. The aforementioned transverse hole 36 through the shank 34 permits the insertion of the shackle of any suitable locking device, such as a padlock (not shown), whereby the socket 38 cannot be removed from the ball 10' unless specifically desired.

This lockable feature of the present invention provides at least two important advantages over devices of the prior art. First, and perhaps foremost, the construction prevents the unauthorized separation of the socket member from the ball member. Accordingly, a trailer may be left lockably attached to a towing vehicle at a launching site while a boat, normally carried on the trailer, is utilized for recreational purposes. It also permits the trailer and its contents to be locked to a fixed structure as discussed hereinafter. The second aspect of this invention is that it produces additional safety in the use of a trailer. It may be seen, for example, should other portions of the hitch unit tend to cause failure and therefore tend to separate the ball from the socket, this locking feature will prevent separation and therefore the towing vehicle will continue to tow the towed vehicle in a safe manner. In addition, this particular construction permits the use of the hitch elements for support plates 26 having different thicknesses. As it may be seen, the bolt 32 can be threaded to a greater or lesser degree within the ball member 10'.

Figure 3:
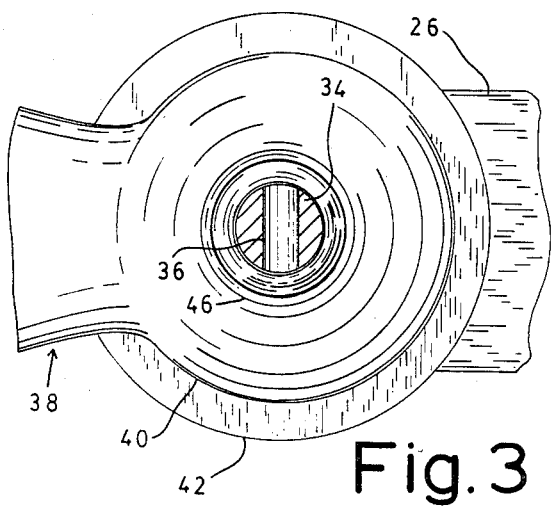
FIG. 3 is a top view of the trailer hitch unit shown in FIG. 2.

A top view of the embodiment of FIG. 2 is shown in FIG. 3. In this view, the washer 48 is not shown such that a clear view of the relationship of the opening 46 to the shank 34 of the bolt may be seen. FIG. 3 is actually taken as a sectional view through the shank 34 at the center line of the hole 36. Accordingly, it may be seen that pivoting of the socket 38 in any direction is permitted because of the clearance between the shank 34 and the opening 46.

Other embodiments of the present invention will occur to one skilled in the art. For example, the passageway through the skirt member 12 and the ball 10' can be threaded a greater length, even the entire length. Even the bolt 32 can be provided with threads the entire length. However, it may be preferrable that the upper portion of the bolt 32 be free of threads to prevent any thread damage should the bolt 32 come in contact with the periphery of the opening 46 during extreme pivoting of a socket member 38 about the ball 10'. The invention in that embodiment will perform in an identical manner to that described in regard to the embodiment of FIG. 2.

Figure 4:
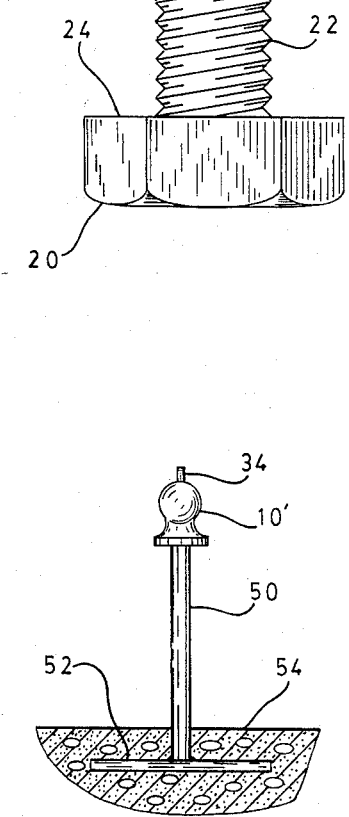
FIG. 4 is a drawing illustrating the present invention as utilized for a permanent installation.

Referring now to FIG. 4, shown therein is a device for securing a trailer or like vehicle at a fixed location. An upright stanchion 50 is provided with an anchor plate 52 which may be secured in the ground or in other structural material 54. This upright stanchion 50 supports a modified ball unit 10' as used in the embodiment shown in FIG. 2. With the stanchion 50 serving as the bolt element, the shank 34 of the bolt element extends above the modified ball 10' in the same fashion as shown in FIG. 2. Accordingly, a trailer or like towable vehicle having a socket member may be releasably secured to the stanchion by placing of a socket member over the ball 10' and locking the same in position by passing a locking element through the hole 36 in the upper end of the shank 34.

The above-identified hitch construction can be used in still another manner to prevent the unauthorized use of a trailer or other towed vehicle. After disconnecting the socket unit of the towed vehicle from the ball unit of a towing vehicle, an unattached ball unit can be inserted into the socket unit and locked therein. This unattached ball unit can be one removed from the towing vehicle, for example, or a separate and substantially identical ball unit.

Accordingly, it will be seen by those versed in the art that an improved hitch construction has been shown and described which provides for increased safety as well as preventing the unauthorized use of a towable vehicle. The principal features of the invention include a ball unit having an axial passageway therethrough, a bolt element threadably engagable with the passageway to mount the ball unit on a support plate or the like with the bolt unit extending through the ball unit and terminating at an end having a transverse hole proximate the end. This hole provides for the acceptance of a shackle of a locking member. In addition, the socket portion of the hitch is provided with a central opening in the dome portion to permit the passage therethrough of the shank of the bolt, with the opening in the dome having sufficient size such that the socket member can be pivoted about the ball member in normal operation of the hitch unit.

It is, of course, understood that although preferred embodiments of the present invention have been illustrated and described, various modifications thereof will become apparent to those skilled in the art. Accordingly, the scope of the invention should only be defined by the appended claims and the equivalents thereof.

I claim:

1. A security hitch member principally for coupling a socket member of a towed vehicle to a towing vehicle, which comprises:
    a ball means having a spherical portion and a skirt portion to be mounted from a support plate of such towing vehicle with said skirt portion in contact with a top surface of said support plate, said ball means provided with an axial passageway extending through said skirt portion and said spherical portion, said passageway provided with internal screw threads throughout at least a portion of the length thereof; and
    bolt means for securing said ball means to said support plate, said bolt means having an enlarged head at a first end to bear against a bottom surface of said support plate, and a shank extending from said head of sufficient length to pass through said support plate and said ball means and extend beyond such socket member when engaged with said spherical portion, said shank having external threads for threadable engagement with said threads within said passageway of said ball means, said shank being further provided with a transverse hole near a further end to receive a shackle of a locking means.

2. The security hitch of claim 1 wherein said spherical portion and said skirt portion are integral.

3. The security hitch of claim 1 wherein:
    said passageway has a first portion within at least said skirt member having said internal screw threads, a central unthreaded portion having a diameter in excess of said threads on said shank, and a further portion of a reduced diameter extending any remaining distance of said spherical portion of said ball means; and
    said shank is provided with a first portion adjacent said head having external threads extending a distance to terminate within said central portion of said passageway when mounting said ball means on said support plate, and a cylindrical further portion having a diameter to be closely received within said further portion of said passageway.

4. A security hitch principally for joining a towed vehicle to a towing vehicle, which comprises:
    a ball means having a spherical portion and a skirt portion to be mounted on a support plate of such towing vehicle, with said skirt portion in contact with an upper surface of said support plate, said ball means being provided with an axial passageway extending through said skirt portion and said spherical portion, said passageway provided with internal screw threads at least throughout said skirt portion;
    a socket means attached to such towed vehicle, said socket means adapted with a dome portion to closely receive said spherical portion of said ball means and including means for releasably engaging said socket means to said ball means, said dome portion being provided with a centrally positioned aperture; and
    a bolt means having first and further ends for securing said ball means to said support plate, said bolt means having an enlarged head portion at said first end to bear against a bottom surface of said support plate and a shank extending from said head portion to said further end of a length sufficient to pass through said support plate, through said ball means and extend through said aperture in said dome of said socket means when said socket means is engaged with said ball means, said shank being provided with external screw threads along at least a portion of the length adjacent said head for threadable engagement with said threads in said passageway, said shank further provided with a transverse hole adjacent said further end to receive a shackle of a locking means.

5. The security hitch of claim 4 further including an apertured washer encircling said shank and interposed between said dome of said socket means and said hole in said shank when said socket means is engaged with said ball means.

6. A security hitch to prevent the unauthorized removal of a towable vehicle from a selected location, which comprises:
    a generally upright stanchion having first and further ends, said first end fixedly secured at such selected location, said further end being provided with external screw threads along a length of said stanchion, and with a transverse hole adjacent said further end to accept a shackle of a locking means;
    a ball means having an integral spherical portion and skirt portion, said ball means being provided with an axial passageway through said skirt portion and said spherical portion, said passageway being provided with internal screw threads at least throughout said skirt portion for threadable engagement with said threads on said stanchion to a position whereby said further end of said stanchion extends through said spherical portion;
    a socket means attached to such towable vehicle, said socket means adapted with a dome portion to closely receive said spherical portion of said ball means, said dome portion being provided with a centrally positioned aperture to accept said further end of said stanchion whereby said dome portion is interposed between said spherical portion of said ball means and said hole of said stanchion and thereby provides for the locking of said socket means to said ball means when said shackle of said lock is passed through said hole.

* * * * *